US012604031B2

(12) United States Patent
Xiu et al.

(10) Patent No.: US 12,604,031 B2
(45) **Date of Patent: *Apr. 14, 2026**

(54) SYSTEM AND METHOD FOR COMBINED INTER AND INTRA PREDICTION

(71) Applicant: BEIJING DAJIA INTERNET INFORMATION TECHNOLOGY CO., LTD., Beijing (CN)

(72) Inventors: Xiaoyu Xiu, San Diego, CA (US); Yi-Wen Chen, San Diego, CA (US); Xianglin Wang, San Diego, CA (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/653,957

(22) Filed: May 2, 2024

(65) Prior Publication Data

US 2024/0283971 A1     Aug. 22, 2024

Related U.S. Application Data

(63) Continuation of application No. 18/631,007, filed on Apr. 9, 2024, which is a continuation of application
(Continued)

(51) Int. Cl.
*H04N 19/527* (2014.01)
*H04N 19/105* (2014.01)
(Continued)

(52) U.S. Cl.
CPC ......... *H04N 19/527* (2014.11); *H04N 19/105* (2014.11); *H04N 19/132* (2014.11); *H04N 19/159* (2014.11); *H04N 19/176* (2014.11)

(58) Field of Classification Search
CPC ........................... H04N 19/527; H04N 19/176
See application file for complete search history.

(56) References Cited

U.S. PATENT DOCUMENTS

2015/0312588 A1   10/2015  Yamamoto et al.
2017/0094305 A1    3/2017  Li et al.
(Continued)

FOREIGN PATENT DOCUMENTS

CN       108702515 A      10/2018
CN       108781294 A      11/2018
(Continued)

OTHER PUBLICATIONS

JPOA issue in Application No. JP2023-133311 dated Oct. 8, 2024 with English translation, (8p).
(Continued)

*Primary Examiner* — Nam D Pham
(74) *Attorney, Agent, or Firm* — Arch & Lake LLP; Hao Tan; Shen Wang

(57)     ABSTRACT

A method for video encoding is provided. The method includes: generating, by an encoder, an inter prediction of a current coding block based on an inter prediction mode; generating, by the encoder, an intra prediction of the current coding block based on an intra prediction mode; generating, by the encoder, a final prediction of the current coding block based on the inter prediction and the intra prediction; determining, by the encoder, that a prediction mode of the current coding block is treated as one unified mode when constructing a most probable mode (MPM) list of a neighboring coding block, the unified mode being predefined as an inter mode, or being predefined as an intra mode; and forming, by the encoder, a video bit-stream with information that a combined inter and intra prediction mode is applied to the current coding block.

20 Claims, 12 Drawing Sheets

Related U.S. Application Data

No. 17/746,836, filed on May 17, 2022, now Pat. No. 11,985,347, which is a continuation of application No. 17/371,926, filed on Jul. 9, 2021, now Pat. No. 11,381,837, which is a continuation of application No. PCT/US2020/012826, filed on Jan. 9, 2020.

(60) Provisional application No. 62/790,421, filed on Jan. 9, 2019.

(51) Int. Cl.

| | |
|---|---|
| *H04N 19/132* | (2014.01) |
| *H04N 19/159* | (2014.01) |
| *H04N 19/176* | (2014.01) |

(56) References Cited

U.S. PATENT DOCUMENTS

| | | | |
|---|---|---|---|
| 2017/0251213 A1* | 8/2017 | Ye | H04N 19/176 |
| 2018/0098065 A1 | 4/2018 | Karczewicz et al. | |
| 2018/0249156 A1 | 8/2018 | Heo et al. | |
| 2018/0376149 A1* | 12/2018 | Zhang | H04N 19/513 |

FOREIGN PATENT DOCUMENTS

| | | |
|---|---|---|
| JP | 7303255 B2 | 7/2023 |
| KR | 20150011739 A | 2/2015 |
| KR | 20180129860 A | 12/2018 |
| KR | 102489605 B1 | 1/2023 |
| WO | 2013047811 A1 | 4/2013 |
| WO | 2017043816 A1 | 3/2017 |
| WO | 2017058899 A1 | 4/2017 |
| WO | 2017188566 A1 | 11/2017 |
| WO | 2018012933 A1 | 1/2018 |
| WO | 2018092869 A1 | 5/2018 |
| WO | 2018200960 A1 | 11/2018 |
| WO | 2018224004 A1 | 12/2018 |
| WO | 2020061082 A1 | 3/2020 |
| WO | 2020106564 A3 | 5/2020 |
| WO | 2020114513 A1 | 6/2020 |

OTHER PUBLICATIONS

JPOA issue in Application No. JP2023-138923 dated Oct. 8, 2024 with English translation, (10p).

The State Intellectual Property Office of People's Republic of China, "First Office Opinion Notice", issued in Application No. 202311175593.0 dated Jul. 3, 2024 with English translation, (10p).

Japanese Intellectual Property Office, "Decision of Refusal" issued in Application No. 2022-088741 dated Aug. 20, 2024 with English Translation, (9p).

Japanese Intellectual Property Office, "Notice of Reasons for Refusal" issued in Application No. 2022-109740 dated Aug. 20, 2024 with English Translation, (6p).

Non-Final Office Action issued in U.S. Appl. No. 18/631,007 dated Mar. 5, 2025, (8p).

Office Action of EP Application No. 20738093.2 dated Mar. 28, 2025, (7p).

Notice of Allowance Decision to Grant issued in JP Application No. 2023-133311 dated Mar. 27, 2025, (5p).

Notice of Allowance Decision to Grant issued in JP Application No. 2023-138923 dated Mar. 27, 2025, (5p).

Office Action issued in Korean Patent Application No. 10-2022-7033810 dated Feb. 26, 2025, (5p).

JPOA issued on Application No. 2022-088741 dated Mar. 11, 2024 with English translation, (12p).

Jianle Chen et al., "Algorithm description for Versatile Video Coding and Test Model 3 (VTM 3)," Joint Video Experts Team (JVET) of ITU-T SG 16 WP 3 and ISO/IEC JTC 1/SC 29/WG 11, JVET-L1002-vl, 12th Meeting: Macao, CN, Oct. 3-12, 2018, (5p).

Benjamin Bross et al., "Versatile Video Coding (Draft 3)," Joint Video Experts Team (JVET) of ITU-T SG 16 WP 3 and ISO/IEC JTC 1/SC 29/WG 11, JVET-L1001-v9, 12th Meeting: Macao, CN, Oct. 3-12, 2018, (7p).

JPOA issued on Application No. 2022-109740 dated Mar. 11, 2024 with English translation, (6p).

International Search Report of PCT Application No. PCT/US2020/012826 dated May 26, 2020, (3p).

Xiaoyu Xiu, et al., "CE9-related: Complexity Reduction and Bit-width Control for Bi-Directional Optical Flow (BIO)," Joint Video Experts Team (JVET) of ITU-T SG 16 WP 3 and ISO/IEC JTC 1/SC 29/WG 11, JVET-L0256-v2, 12th Meeting: Macao, CN, Oct. 3-12, 2018, (15p).

Non-Final Office Action issued in U.S. Appl. No. 17/371,607 dated Dec. 13, 2021, (21p).

First JPOA issued on Patent Application No. 2021-540266 with English translation, (7p).

Second JPOA issued on Patent Application No. 2021-540266 with English translation, (9p).

Winken, Martin et al., "CE10: Multi-Hypothesis Inter Prediction (Test 10.1.2)," Joint Video Experts Team (JVET), Jan. 7, 2019, [JVET-M0425-v2] (version 2), (15p).

First JPOA issued on Patent Application No. 2021-127431 dated Nov. 16, 2021 with English translation, (10p).

Rejection Decision of JPOA issued on Patent Application No. 2021-127431 dated Feb. 2, 2022 with English translation, (11p).

Bross, Benjamin et al., "Versatile Video Coding (Draft 3)," Joint Video Experts Team (JVET), Jan. 8, 2019, [JVET-L1001-v9] (version 13), (7p).

Pre-Appeal Examination Report of Japanese Patent Application No. JP2021-540266 dated Oct. 4, 2022 with English translation, (5p).

Notice of Rejection of JP Application No. 2021-127431 dated Dec. 6, 2022 with English translation, (15p).

Examination Report issued on Indian Application No. 202148032621 dated Dec. 2, 2022 with English translation, (6p).

First Office Action of European Patent Application No. 20738093.2 dated Mar. 21, 2022, (7p).

Supplementary Search Report of European Patent Application No. 20738093.2 dated Mar. 9, 2022, (5p).

Hashimoto, Tomonori, et al., "Non-CE4: Weighted Prediction with BDOF and bi-predition with CU weights harmonization," Joint Video Experts Team (JVET) of ITU-T SG 16 WP 3 and ISO/IEC JTC 1/SC 29/WG 11, JVET-M0067-v1, 13th Meeting: Marrakesh, MA, Jan. 9-18, 2019, (6p).

Extended European Search Report of EP Application No. 21193757 dated Mar. 10, 2022, (11p).

Rejection Decision of Japanese Patent Application No. 2021-540266 dated Apr. 12, 2022 with English translation, (5p).

First KROA issued on Application No. 10-2021-7023688 dated Mar. 24, 2022 with English translation, (7p).

First KROA issued on Application No. 10-2021-7024920 dated Apr. 22, 2022 with English translation, (7p).

Benjamin Bross et al., "Versatile Video Coding (Draft 3)," Joint Video Experts Team (JVET) of ITU-T SG 16 WP 3 and ISO/IEC JTC 1/SC 29/WG 11, JVET-L1001-v7, 12th Meeting: Macao, CN, Oct. 3-12, 2018, (110p).

Final Office Action of U.S. Appl. No. 17/371,607 dated Mar. 29, 2022, (22p).

Secondary KROA issued on Application No. 10-2021-7023688 dated Jul. 6, 2022 with English translation, (5p).

KROA Written Decision on Registration of Application No. 10-20217024920 dated Aug. 1, 2022 with English translation, (4p).

INOA of Application No. 202147030648 dated on Jul. 12, 2022 with English translation, (6p).

Biao Wang et al., Huawei Technologies Co., Ltd. "CE10-related: modification for blocks applied with combined inter-intra prediction", Joint Video Experts Team (JVET) of ITU-T SG 16 WP 3 and ISO/IEC JTC 1/SC 29/WG 11, JVET-M0294, 13th Meeting: Marrakesh, Morocco, Jan. 9-18, 2019, (7p).

Jianle Chen et al., "Algorithm description for Versatile Video Coding and Test Model 3 (VTM 3)," Joint Video Experts Team (JVET) of ITU-T SG 16 WP 3 and ISO/IEC JTC 1/SC 29/WG 11, JVET-L1002-v1, 12th Meeting: Macao, CN, Oct. 3-12, 2018, (37p).

(56)     References Cited

OTHER PUBLICATIONS

The First CNOA issued on Application No. CN202110784990.2 dated Jul. 7, 2022 with English translation, (20p).

Jianle Chen et al., "Algorithm description for Versatile Video Coding and Test Model 3 (VTM 3)," Joint Video Experts Team (JVET) of ITU-T SG 16 WP 3 and ISO/IEC JTC 1/SC 29/WG 11, JVET-L1002-v2, 12th Meeting: Macao, CN, Oct. 3-12, 2018, (48p).

The Reconsideration Report by Examiner before Appeal of JP Application No. 2021-127431 dated Aug. 2, 2022 with English translation, (5p).

Benjamin Bross et al., "Versatile Video Coding (Draft 3)," Joint Video Experts Team (JVET) of ITU-T SG 16 WP 3 and ISO/IEC JTC 1/SC 29/WG 11, JVET-L1001-v9, 12th Meeting: Macao, CN, Oct. 12, 2018, (233p).

Chen, jianle et al., "Algorithm description for Versatile Video Coding and Test Model 3 (VTM 3)," Joint Video Experts Team (JVET), [JVET-L1002-v1] (version 2), (7p).

Benjamin Bross, "Versatile Video Coding(Draft 3)". Joint Video Experts Team (JVET) of ITU-T SG 16 WP 3 and ISO/IEC JTC 1/SC 29/WG 11, 12rh Meeting: Macao. CN, Oct. 3-12, 2018, JVET-L1001-v9, (233p).

Chen, Jianle, et al., "Algorithm Description for Versatile Video Coding and Test Model 3 (VTM 3)", Joint Video Experts Team (JVET), Dec. 24, 2018, JVET-L1002-v1 (version 2), (7p).

First Office Action issued in Korean Application No. 10-2023-7001436 dated Jun. 23, 2025 with English translation, (7p).

INOA issued in Application No. 202148032621 dated Jan. 7, 2026, (2p).

* cited by examiner

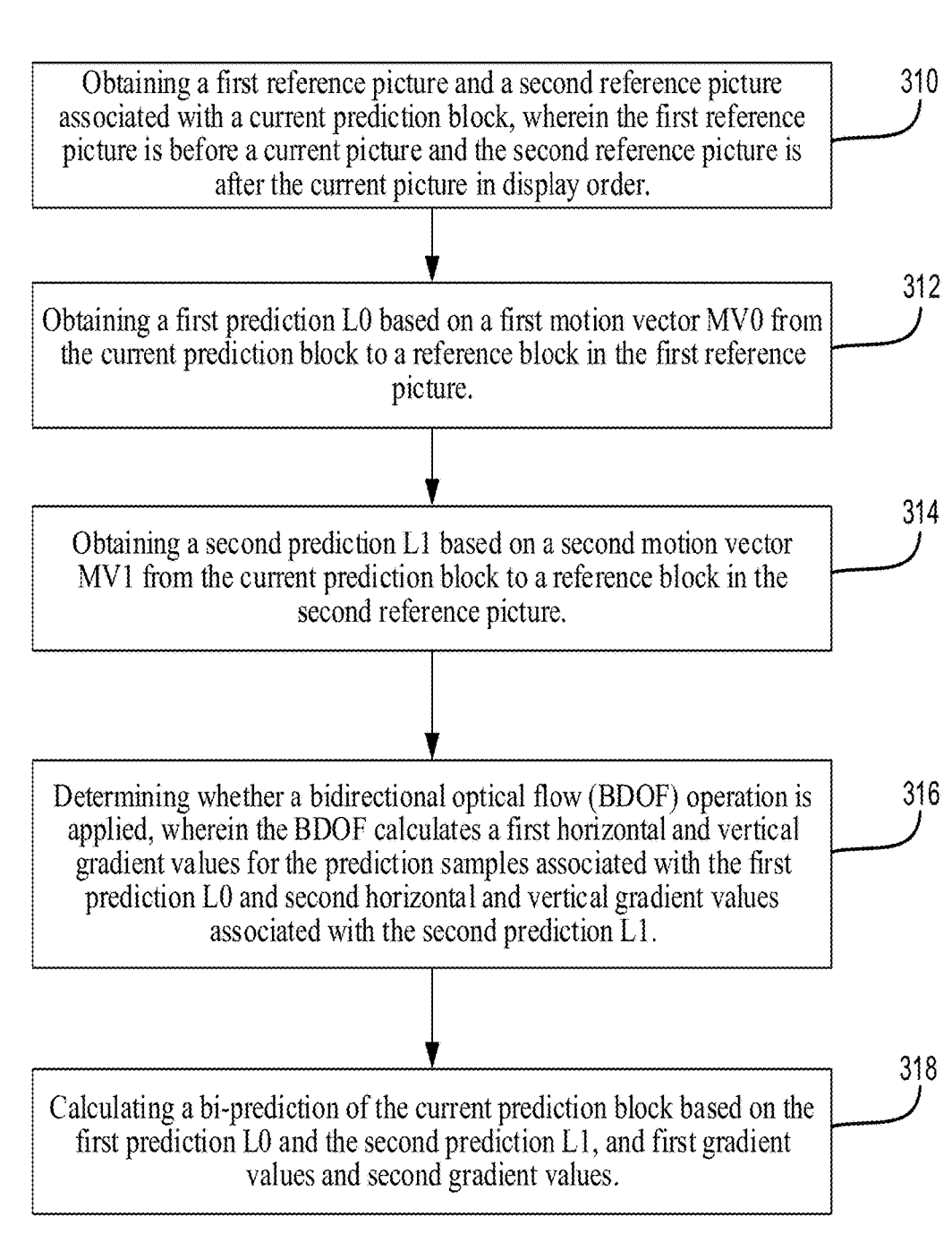

300

Obtaining a first reference picture and a second reference picture associated with a current prediction block, wherein the first reference picture is before a current picture and the second reference picture is after the current picture in display order.          310

Obtaining a first prediction L0 based on a first motion vector MV0 from the current prediction block to a reference block in the first reference picture.          312

Obtaining a second prediction L1 based on a second motion vector MV1 from the current prediction block to a reference block in the second reference picture.          314

Determining whether a bidirectional optical flow (BDOF) operation is applied, wherein the BDOF calculates a first horizontal and vertical gradient values for the prediction samples associated with the first prediction L0 and second horizontal and vertical gradient values associated with the second prediction L1.          316

Calculating a bi-prediction of the current prediction block based on the first prediction L0 and the second prediction L1, and first gradient values and second gradient values.          318

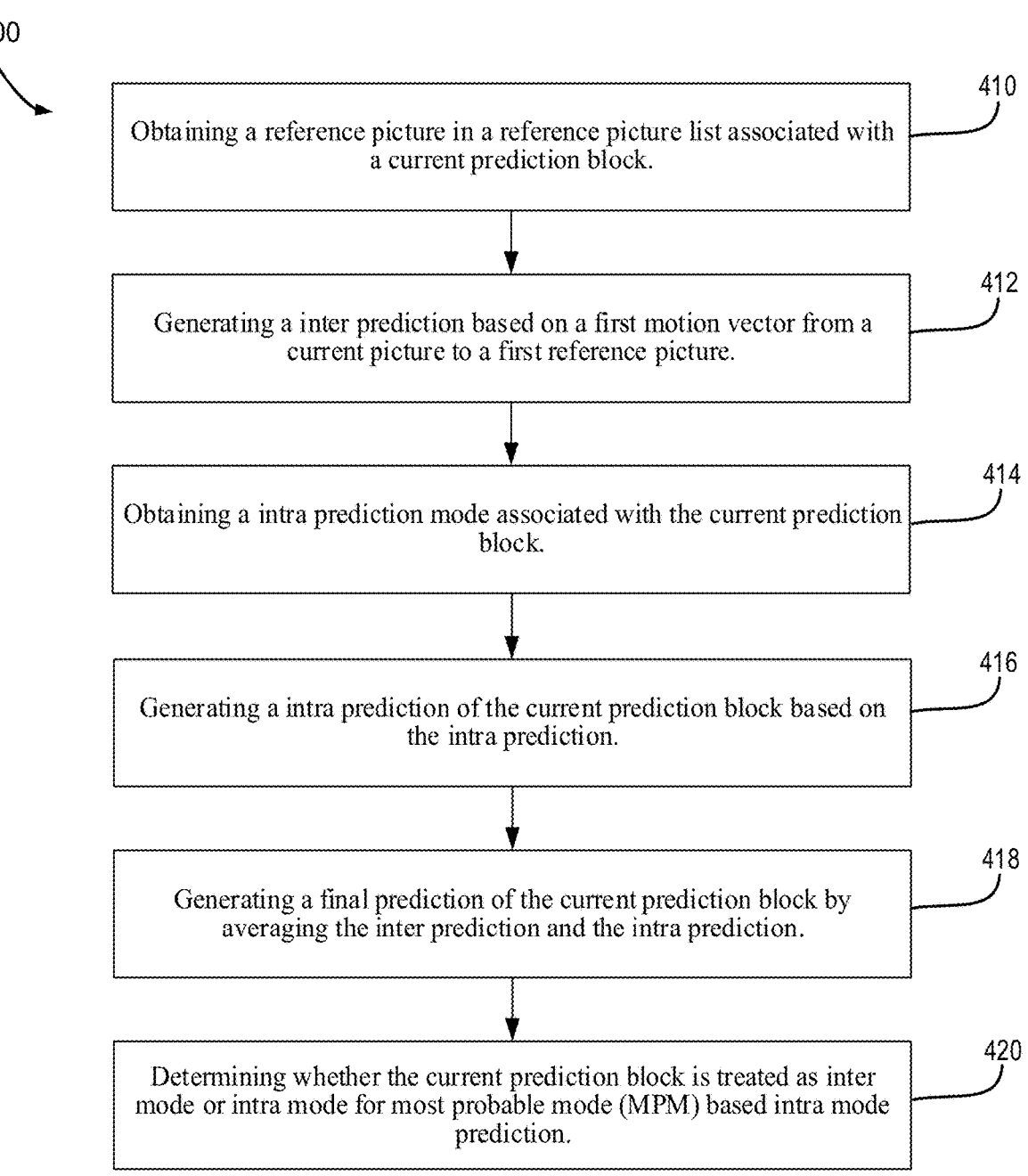

410

Obtaining a reference picture in a reference picture list associated with a current prediction block.

412

Generating a inter prediction based on a first motion vector from a current picture to a first reference picture.

414

Obtaining a intra prediction mode associated with the current prediction block.

416

Generating a intra prediction of the current prediction block based on the intra prediction.

418

Generating a final prediction of the current prediction block by averaging the inter prediction and the intra prediction.

420

Determining whether the current prediction block is treated as inter mode or intra mode for most probable mode (MPM) based intra mode prediction.

FIG. 4

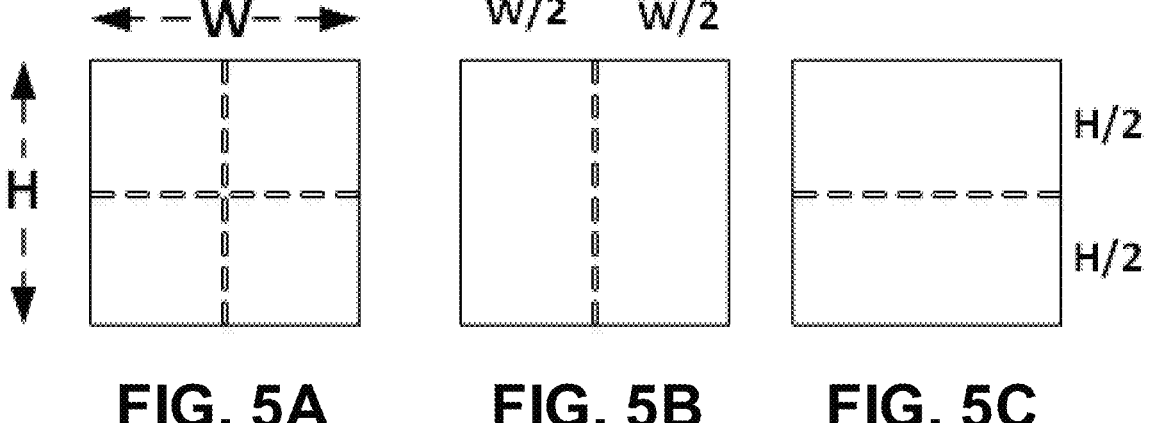
FIG. 5A          FIG. 5B          FIG. 5C
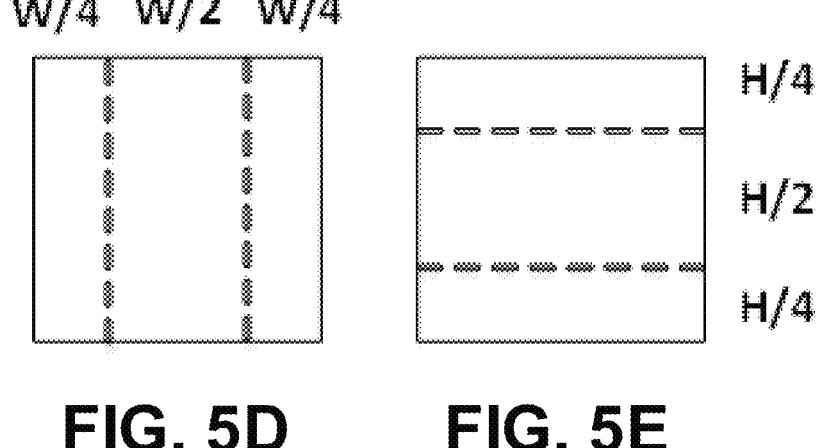
FIG. 5D          FIG. 5E

$$P_{CIIP} = \frac{5}{8}P_{inter} + \frac{3}{8}P_{intra}$$

$$P_{CIIP} = \frac{3}{4}P_{inter} + \frac{1}{4}P_{intra}$$

$$P_{CIIP} = \frac{1}{4}P_{inter} + \frac{3}{4}P_{intra}$$

$$P_{CIIP} = \frac{3}{8}P_{inter} + \frac{5}{8}P_{intra}$$

$$P_{CIIP} = \frac{1}{4}P_{inter} + \frac{3}{4}P_{intra}$$

$$P_{CIIP} = \frac{3}{8}P_{inter} + \frac{5}{8}P_{intra}$$

$$P_{CIIP} = \frac{5}{8}P_{inter} + \frac{3}{8}P_{intra}$$

$$P_{CIIP} = \frac{3}{4}P_{inter} + \frac{1}{4}P_{intra}$$

$$P_{CIIP} = \frac{1}{2}P_{inter} + \frac{1}{2}P_{intra}$$

FIG. 11A                    FIG. 11B

Computing Environment 1210

Processor 1220

Memory 1240

Predetermined Software 1242

I/O interface 1250

User interface 1260

SYSTEM AND METHOD FOR COMBINED INTER AND INTRA PREDICTION

CROSS-REFERENCE TO RELATED APPLICATIONS

The present application is a continuation application of U.S. patent application Ser. No. 18/631,007, filed on Apr. 9, 2024, which is a continuation application of U.S. patent application Ser. No. 17/746,836, filed on May 17, 2022, which is a continuation application of U.S. patent application Ser. No. 17/371,926, filed on Jul. 9, 2021, which is a continuation application of International Application No. PCT/US2020/012826, filed on Jan. 9, 2020, which is based upon and claims priority to Provisional Application No. 62/790,421 filed on Jan. 9, 2019. The entire disclosures of the above applications are incorporated herein by reference for all purposes.

TECHNICAL FIELD

This application is related to video coding and compression. More specifically, this application relates to methods and apparatus on combined inter and intra prediction (CIIP) method for video coding.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

SUMMARY

Examples of the present disclosure provide methods for improving the efficiency of the syntax signaling of merge related modes.

According to a first aspect of the present disclosure, a method of video encoding is provided. The method includes: generating, by an encoder, an inter prediction of a current coding block based on an inter prediction mode; generating, by the encoder, an intra prediction of the current coding block based on an intra prediction mode; generating, by the encoder, a final prediction of the current coding block based on the inter prediction and the intra prediction; determining, by the encoder, that a prediction mode of the current coding block is treated as one unified mode when constructing a most probable mode (MPM) list of a neighboring coding block, the unified mode being predefined as an inter mode, or being predefined as an intra mode; and forming, by the encoder, a video bit-stream with information that a combined inter and intra prediction mode is applied to the current coding block.

According to a second aspect of the present disclosure, a video encoding device is provided. The video encoding device includes one or more processors and one or more storages coupled to the one or more processors. Further, the video encoding device is configured to perform operations including: generating an inter prediction of a current coding block based on an inter prediction mode; generating an intra prediction of the current coding block based on an intra prediction mode; generating a final prediction of the current coding block based on the inter prediction and the intra prediction; determining that a prediction mode of the current coding block is treated as one unified mode when constructing a most probable mode (MPM) list of a neighboring coding block, the unified mode being predefined as an inter mode, or being predefined as an intra mode; and forming a video bit-stream with information that a combined inter and intra prediction mode is applied to the current coding block.

According to a third aspect of the present disclosure, a non-transitory computer-readable storage medium having stored therein instructions is provided. The non-transitory computer readable storage medium stores a bitstream encoded according to a method including: generating an inter prediction of a current coding block based on an inter prediction mode; generating an intra prediction of the current coding block based on an intra prediction mode; generating a final prediction of the current coding block based on the inter prediction and the intra prediction; determining that a prediction mode of the current coding block is treated as one unified mode when constructing a most probable mode (MPM) list of a neighboring coding block, the unified mode being predefined as an inter mode, or being predefined as an intra mode; and forming a video bit-stream with information that a combined inter and intra prediction mode is applied to the current coding block.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 3 is a flow chart illustrating a method for generating combined inter and intra prediction (CIIP), according to an example of the present disclosure.

FIG. 4 is a flow chart illustrating a method for generating CIIP, according to an example of the present disclosure.

FIG. 5A is a diagram illustrating block partitions in a multi-type tree structure, according to an example of the present disclosure.

FIG. 5B is a diagram illustrating block partitions in a multi-type tree structure, according to an example of the present disclosure.

FIG. 5C is a diagram illustrating block partitions in a multi-type tree structure, according to an example of the present disclosure.

FIG. 5D is a diagram illustrating block partitions in a multi-type tree structure, according to an example of the present disclosure.

FIG. 5E is a diagram illustrating block partitions in a multi-type tree structure, according to an example of the present disclosure.

3

Figure 6A:
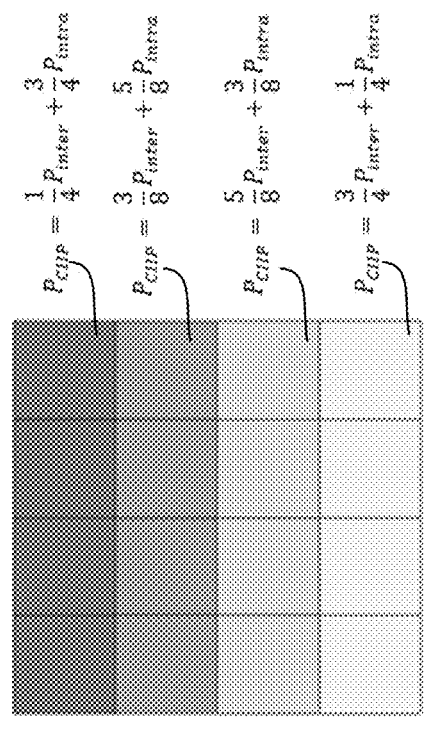

FIG. 6A is a diagram illustrating a combined inter and intra prediction (CIIP), according to an example of the present disclosure.

Figure 6B:
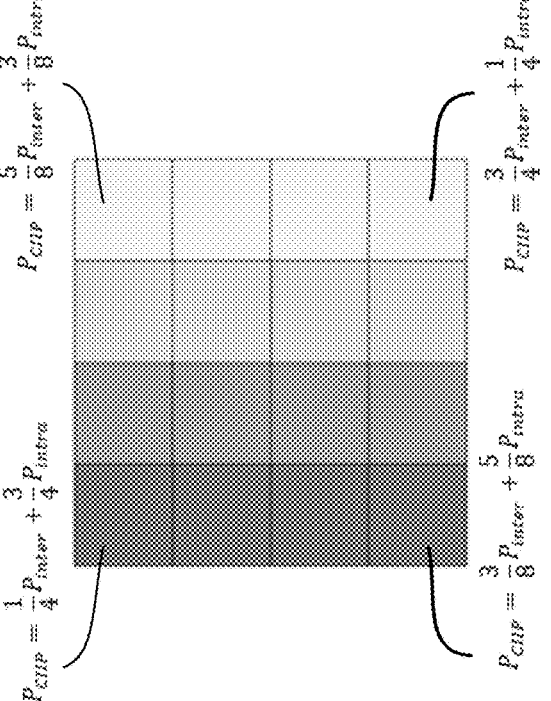

FIG. 6B is a diagram illustrating a combined inter and intra prediction (CIIP), according to an example of the present disclosure.

Figure 6C:
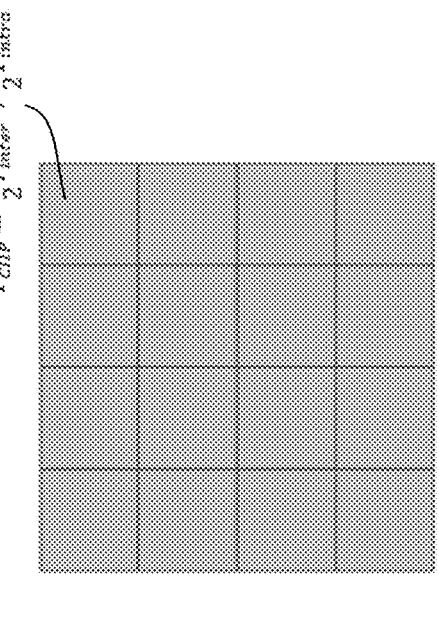

FIG. 6C is a diagram illustrating a combined inter and intra prediction (CIIP), according to an example of the present disclosure.

Figure 7B:
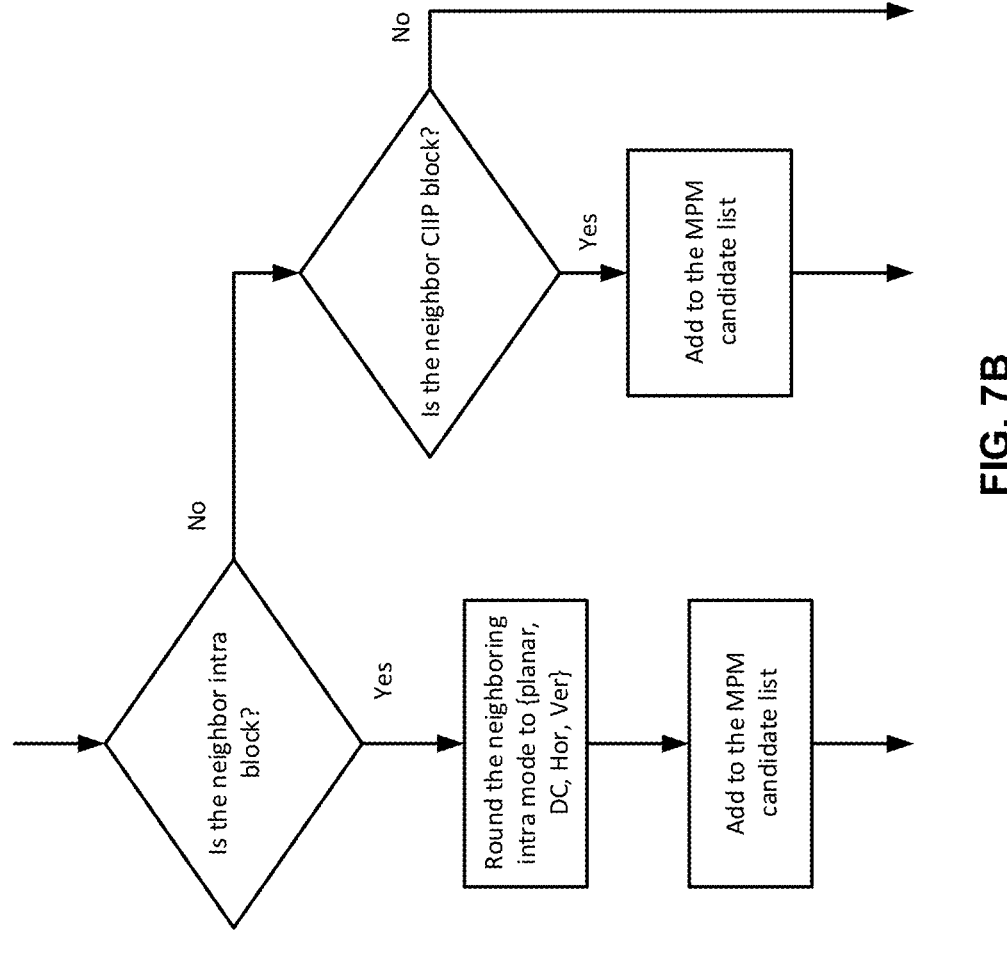
Figure 7A:
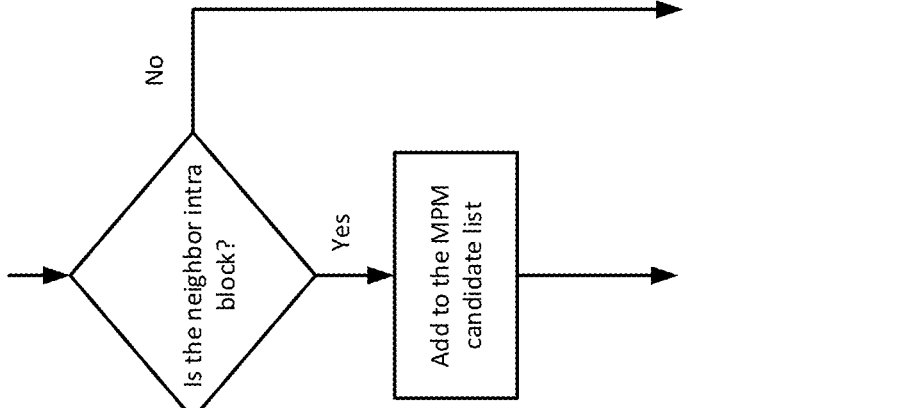

FIG. 7A is a flowchart of the MPM candidate list generation processes, according to an example of the present disclosure.

FIG. 7B is a flowchart of the MPM candidate list generation processes, according to an example of the present disclosure.

Figure 8:
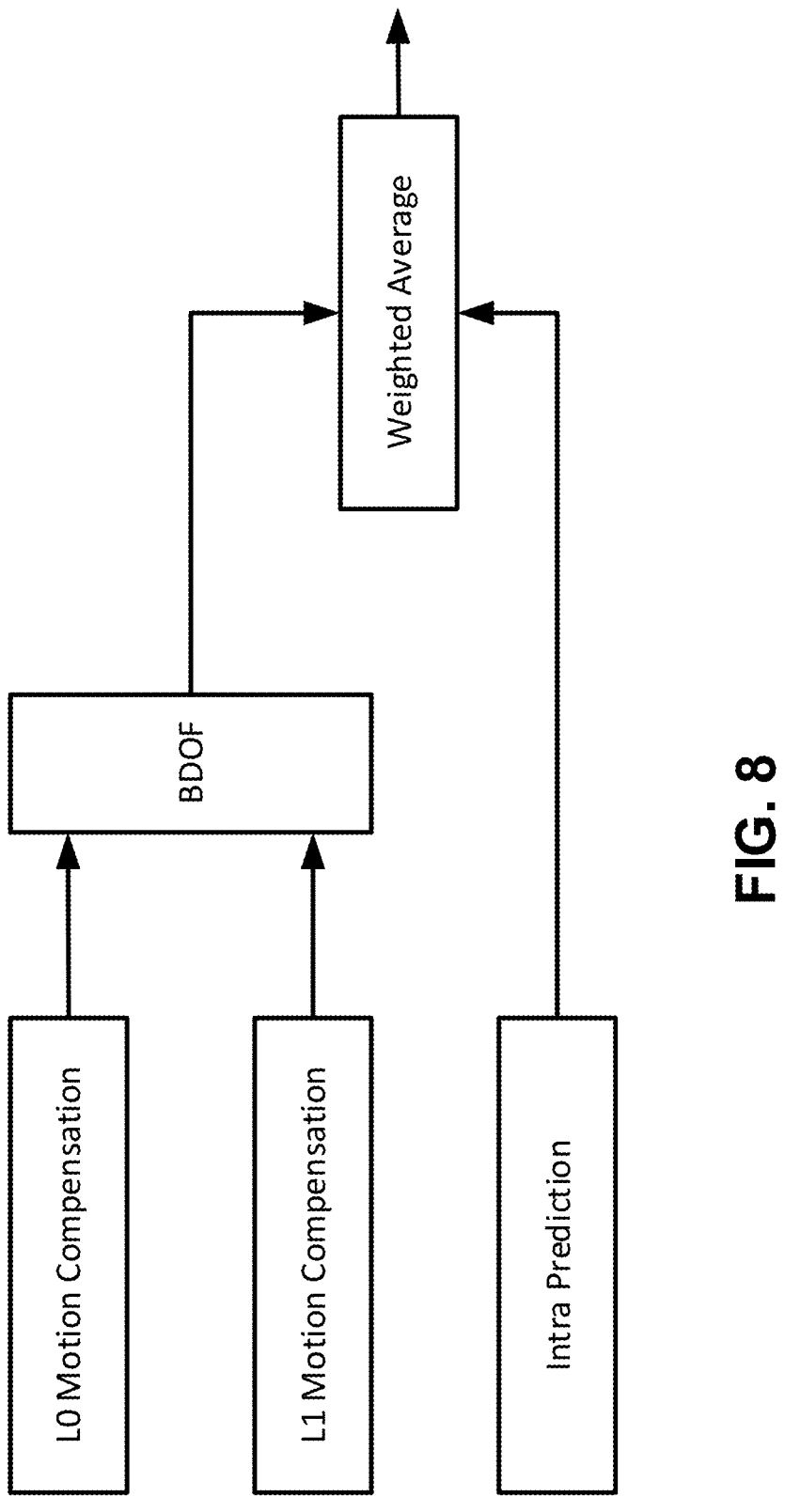

FIG. 8 is a diagram illustrating a workflow of the existing CIIP design in the VVC, according to an example of the present disclosure.

Figure 9:
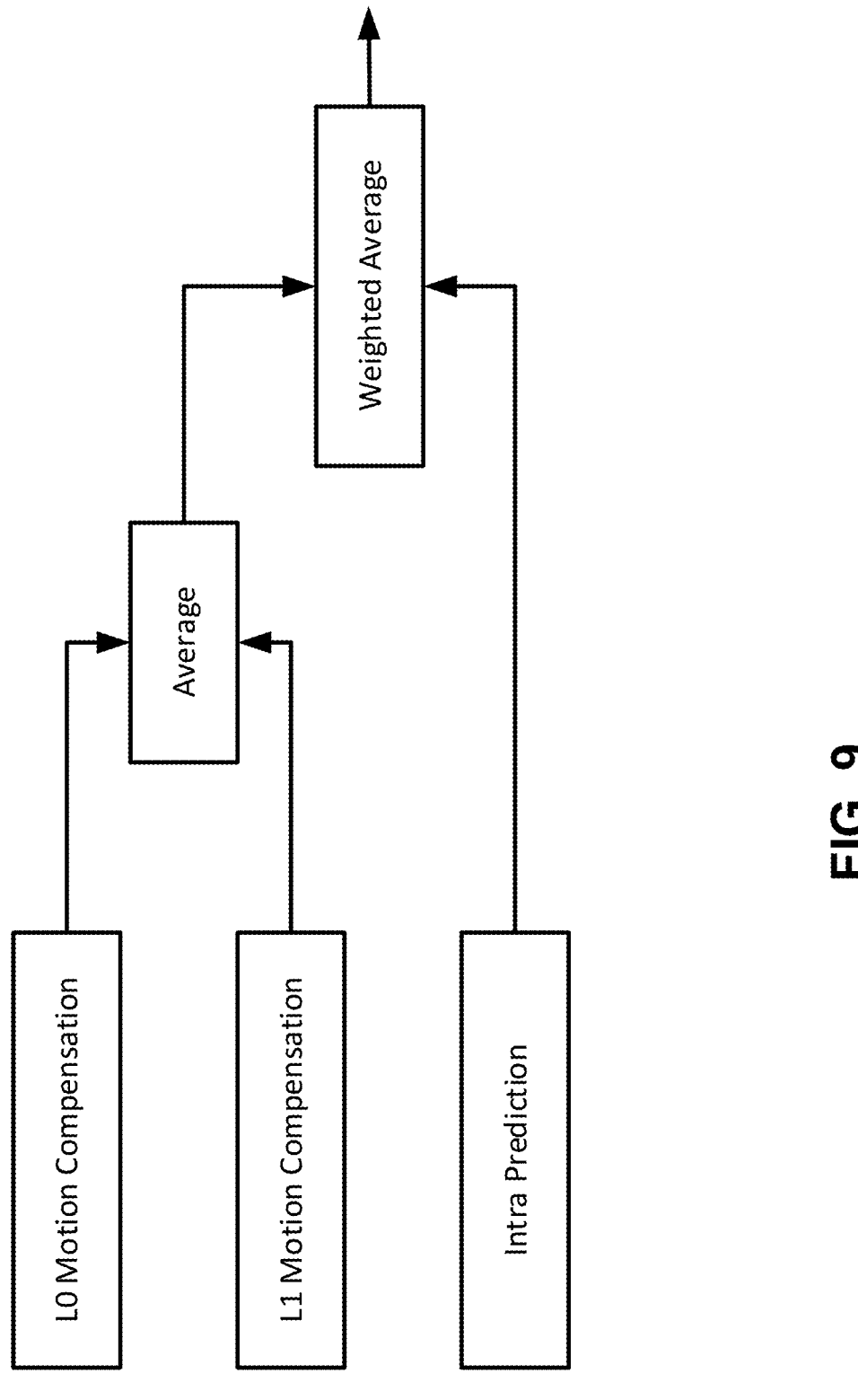

FIG. 9 is a diagram illustrating a workflow of the proposed CIIP method by removing BDOF, according to an example of the present disclosure.

Figure 10:
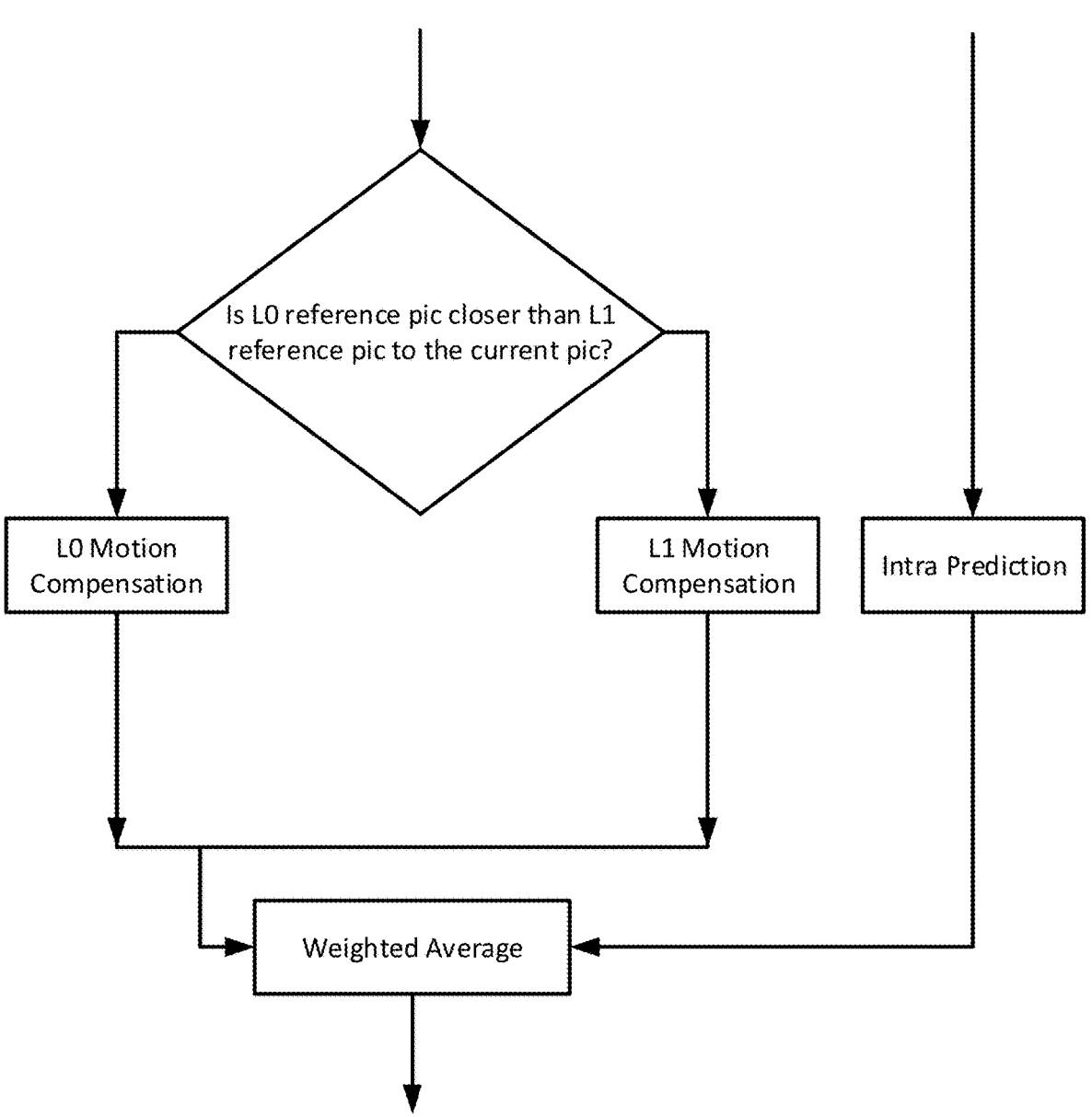

FIG. 10 is a diagram illustrating a workflow of the uni-prediction based CIIP with selecting prediction list based on POC distance, according to an example of the present disclosure.

Figure 11:
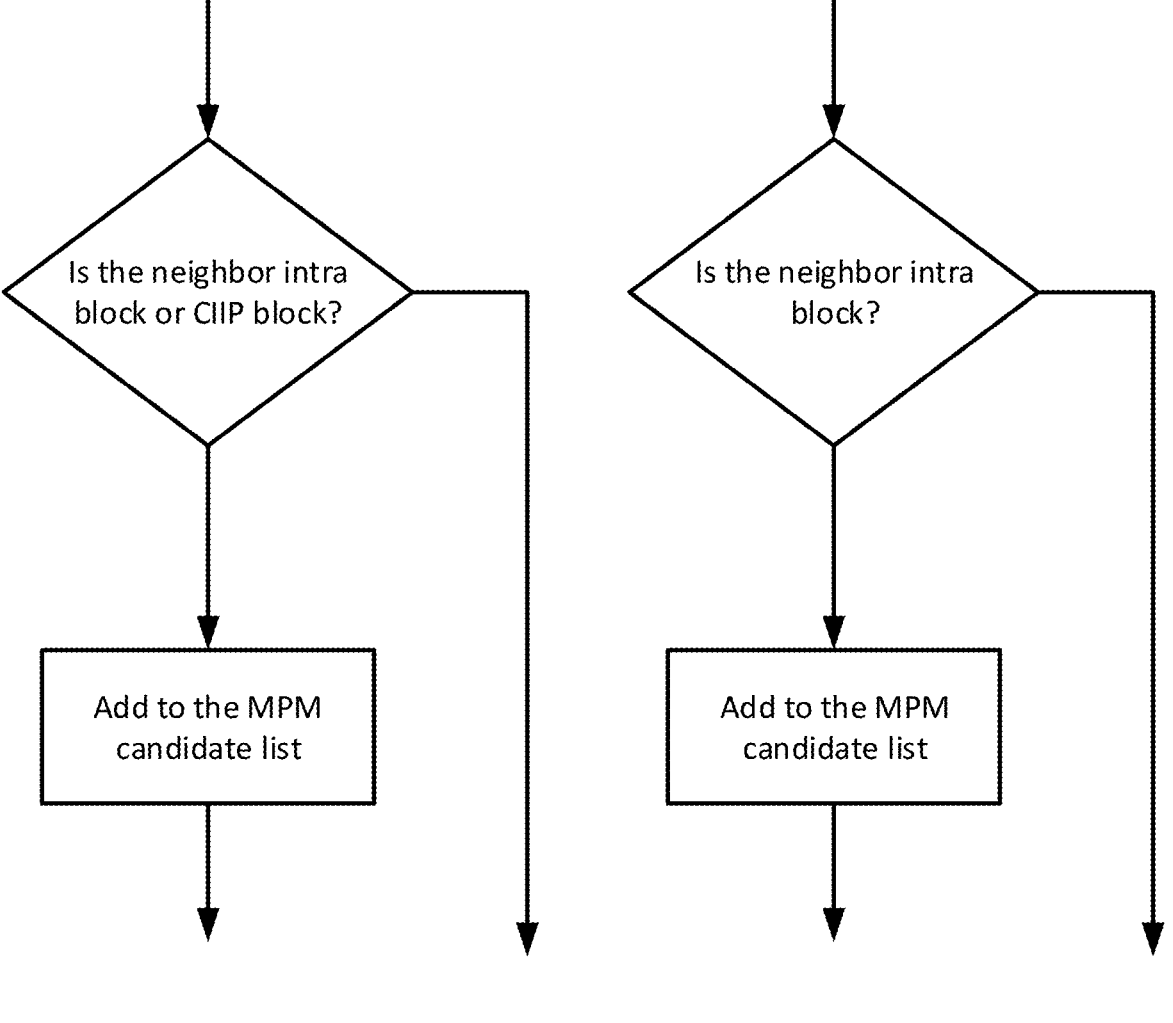

FIG. 11A is a flowchart of the methods when enabling CIIP blocks for the MPM candidate list generation, according to an example of the present disclosure.

FIG. 11B is a flowchart of the methods when disabling CIIP blocks for the MPM candidate list generation, according to an example of the present disclosure.

Figure 12:
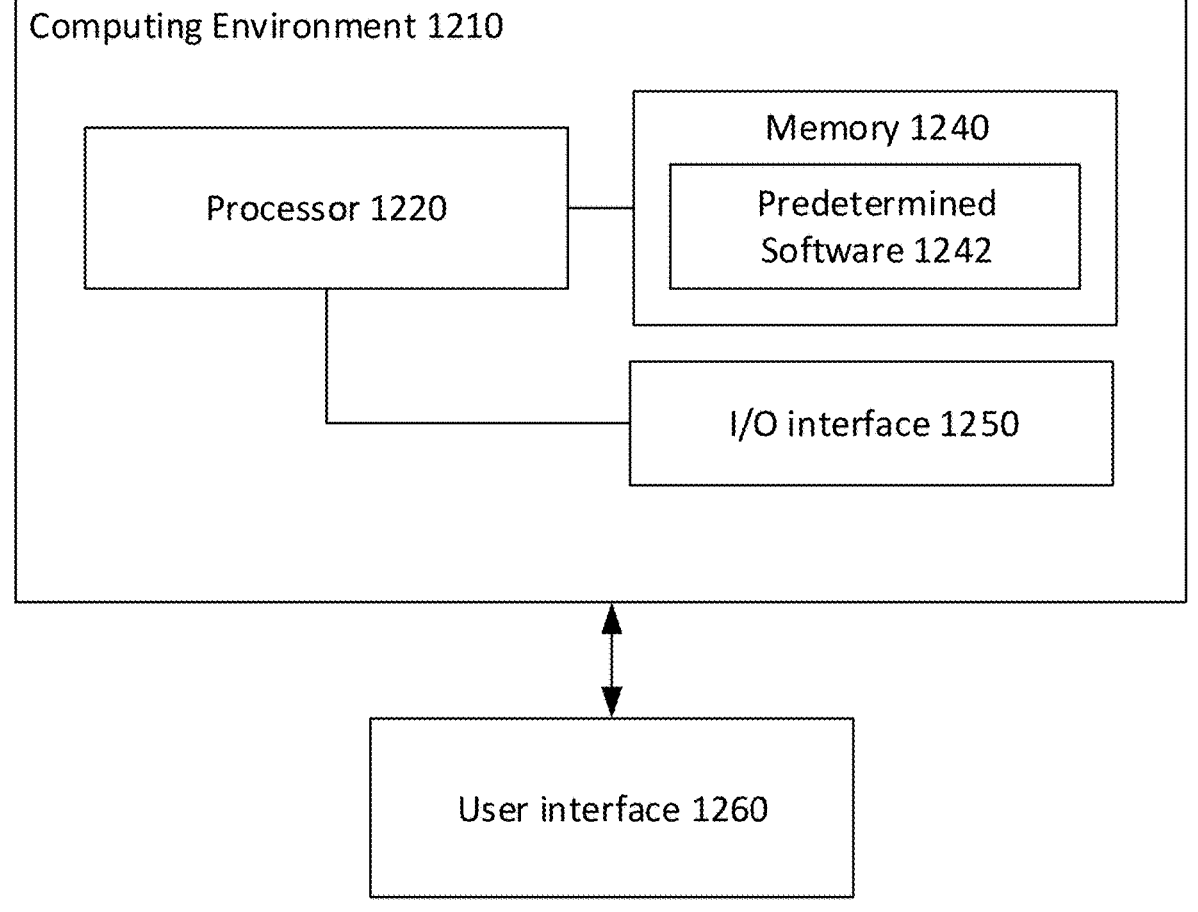

FIG. 12 is a diagram illustrating a computing environment coupled with a user interface, according to an example of the present disclosure.

DETAILED DESCRIPTION

Reference will now be made in detail to examples of the present disclosure, examples of which are illustrated in the accompanying drawings. The following description refers to the accompanying drawings in which the same numbers in different drawings represent the same or similar elements unless otherwise represented. The implementations set forth in the following description of examples of the present disclosure do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. one Joint Video Exploration Team (JVET) was formed in October 2015 by ITU-T VECG and ISO/IEC MPEG to begin significant study of advanced technologies that could enable substantial enhancement of coding efficiency. One reference software called joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month, one reference software codebase, called VVC test model (VTM), was established for demonstrating a reference implementation of the VVC standard.

Figure 1:
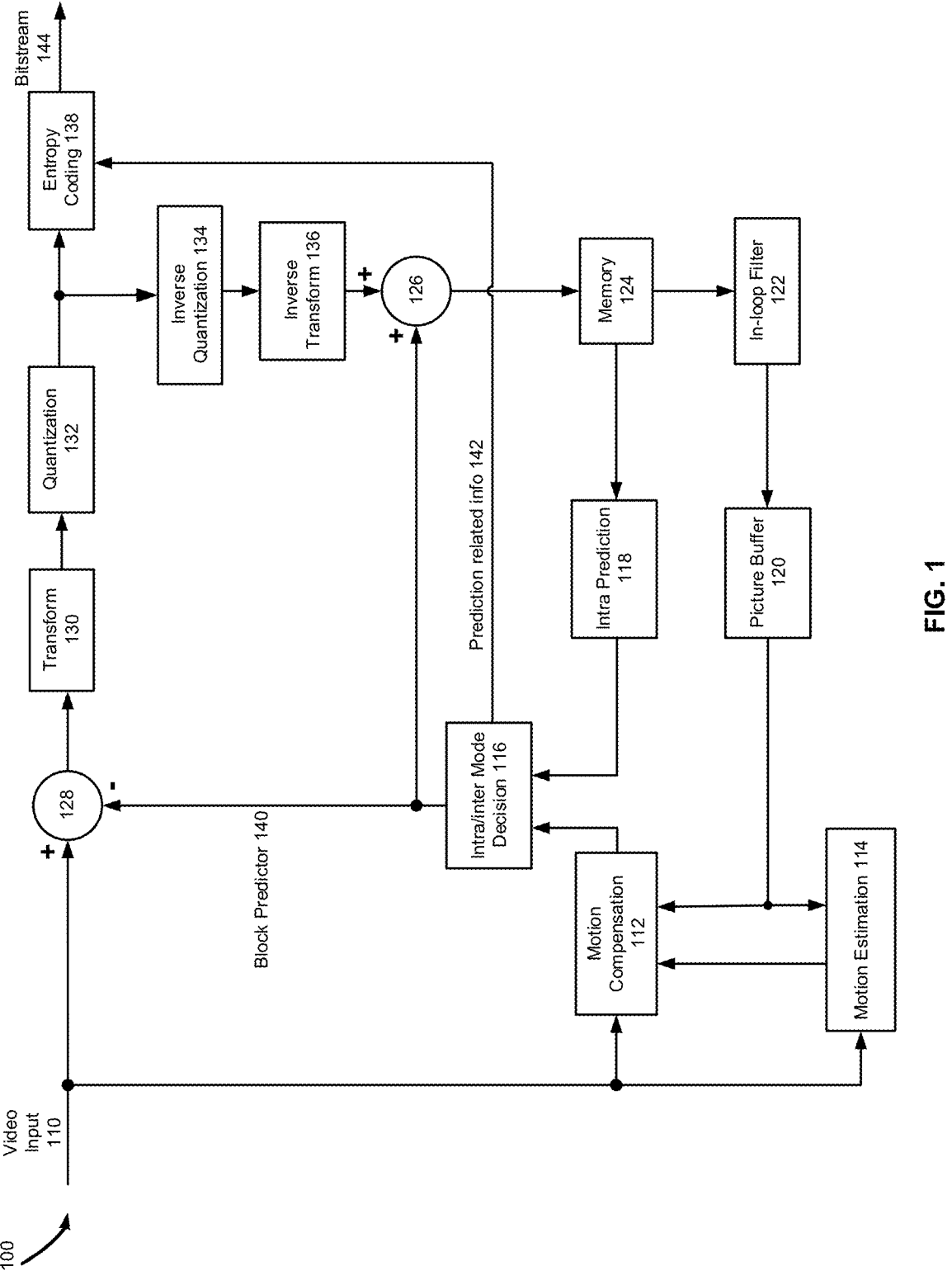
FIG. 1 is a block diagram of an encoder, according to an example of the present disclosure.

Like HEVC, the VVC is built upon the block-based hybrid video coding framework. FIG. 1 (described below) gives the block diagram of a generic block-based hybrid video encoding system. The input video signal is processed block by block (called coding units (CUs)). In VTM-1.0, a CU can be up to 128×128 pixels. However, different from the HEVC which partitions blocks only based on quad-trees, in the VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure. As shown in FIG. 5A, FIG. 5B, FIG. 5C, FIG. 5D, and FIG. 5E (described below), there are five splitting types, quaternary partitioning, horizontal binary partitioning, vertical binary partitioning, horizontal ternary partitioning, and vertical ternary partitioning, respectively.

In FIG. 1 (described below), spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, when multiple reference pictures are supported, one reference picture index is additionally sent, which is used to identify from which reference picture in the reference picture store the temporal prediction signal comes. After spatial and/or temporal prediction, the mode decision block in the encoder chooses the best prediction mode, for example based on the rate-distortion optimization method. The prediction block is then subtracted from the current video block; and the prediction residual is de-correlated using transform and quantized.

The quantized residual coefficients are inverse quantized and inverse transformed to form the reconstructed residual, which is then added back to the prediction block to form the reconstructed signal of the CU. Further in-loop filtering, such as deblocking filter, sample adaptive offset (SAO) and adaptive in-loop filter (ALF) may be applied on the reconstructed CU before it is put in the reference picture store and used to code future video blocks. To form the output video bit-stream, coding mode (inter or intra), prediction mode information, motion information, and quantized residual coefficients are all sent to the entropy coding unit to be further compressed and packed to form the bit-stream.

Figure 2:
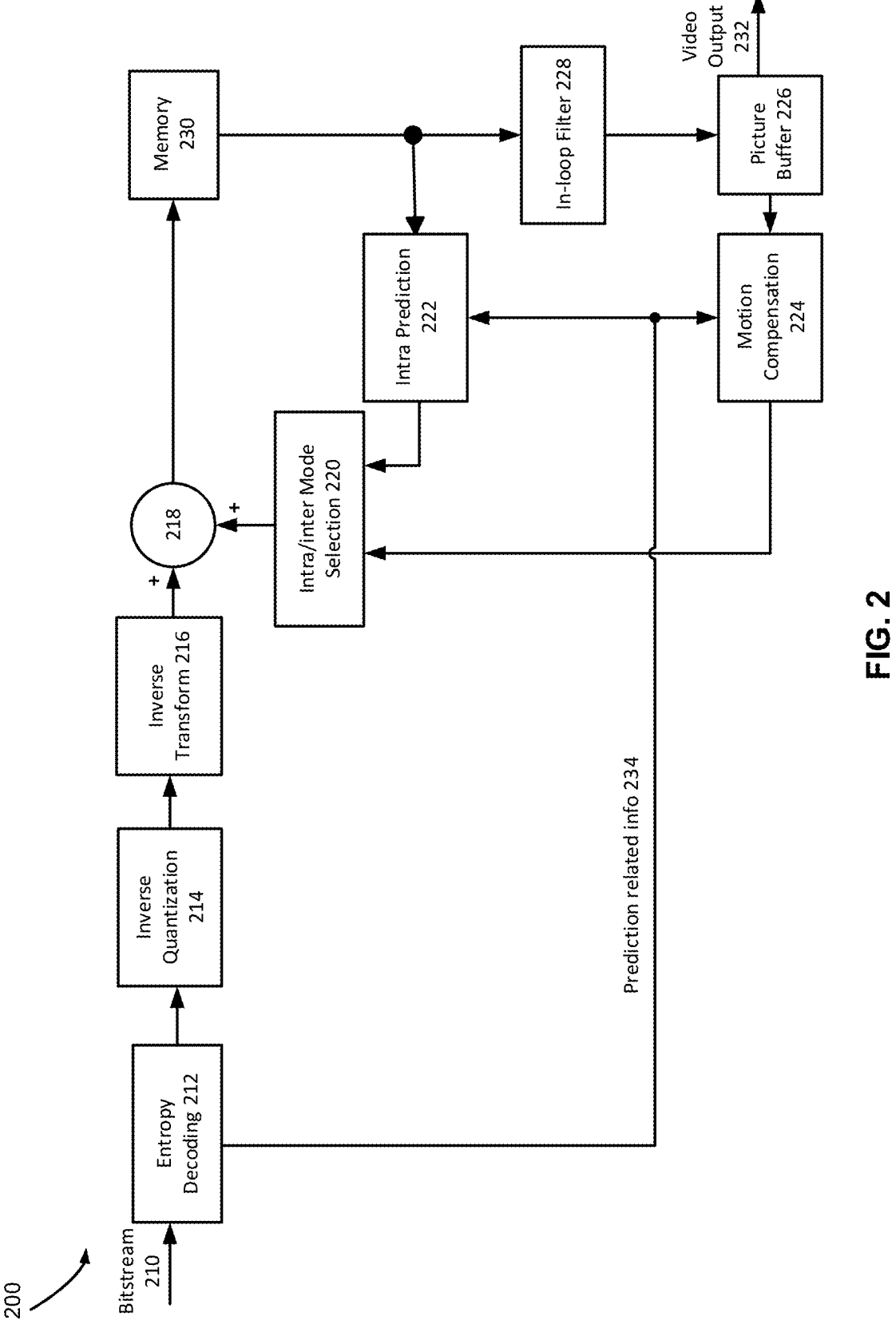
FIG. 2 is a block diagram of a decoder, according to an example of the present disclosure.

FIG. 2 (described below) gives a general block diagram of a block-based video decoder. The video bit-stream is first entropy decoded at entropy decoding unit. The coding mode and prediction information are sent to either the spatial prediction unit (when intra coded) or the temporal prediction unit (when inter coded) to form the prediction block. The residual transform coefficients are sent to inverse quantization unit and inverse transform unit to reconstruct the residual block. The prediction block and the residual block are then added together. The reconstructed block may further go through in-loop filtering before it is stored in reference picture store. The reconstructed video in reference picture store is then sent out to drive a display device, as well as used to predict future video blocks.

FIG. 1 shows a typical encoder 100. The encoder 100 has video input 110, motion compensation 112, motion estimation 114, intra/inter mode decision 116, block predictor 140, adder 128, transform 130, quantization 132, prediction related info 142, intra prediction 118, picture buffer 120, inverse quantization 134, inverse transform 136, adder 126, memory 124, in-loop filter 122, entropy coding 138, and bitstream 144.

FIG. 2 shows a typical decoder 200 block diagram. Decoder 200 has bitstream 210, entropy decoding 212, inverse quantization 214, inverse transform 216, adder 218, intra/inter mode selection 220, intra prediction 222, memory 230, in-loop filter 228, motion compensation 224, picture buffer 226, prediction related info 234, and video output 232.

FIG. 3 shows an example method 300 for generating combined inter and intra prediction (CIIP) in accordance to the present disclosure.

In step 310, obtaining a first reference picture and a second reference picture associated with a current prediction block, wherein the first reference picture is before a current picture and the second reference picture is after the current picture in display order.

In step 312, obtaining a first prediction L0 based on a first motion vector MV0 from the current prediction block to a reference block in the first reference picture.

In step 314, obtaining a second prediction L1 based on a second motion vector MV1 from the current prediction block to a reference block in the second reference picture.

In step 316, determining whether a bidirectional optical flow (BDOF) operation is applied, wherein the BDOF calculates a first horizontal and vertical gradient values for the prediction samples associated with the first prediction L0 and second horizontal and vertical gradient values associated with the second prediction L1. For example, the BDOF calculates a first horizontal and vertical gradient values $$\frac{\partial I^{(0)}}{\partial x}(i, j)\text{'s and } \frac{\partial I^{(0)}}{\partial y}(i, j)\text{'s}$$

for the prediction samples associated with the first prediction L0 and second horizontal and vertical gradient values $$\frac{\partial I^{(1)}}{\partial x}(i, j)\text{'s and } \frac{\partial I^{(1)}}{\partial y}(i, j)\text{'s}$$

associated with the second prediction L1.

In step 318, Calculating a bi-prediction of the current prediction block based on the first prediction L0 and the second prediction L1, and first gradient values and second gradient values. For example, first gradient values $$\frac{\partial I^{(0)}}{\partial x}(i, j)\text{'s and } \frac{\partial I^{(0)}}{\partial y}(i, j)\text{'s}$$

and second gradient values $$\frac{\partial I^{(1)}}{\partial x}(i, j)\text{'s and } \frac{\partial I^{(1)}}{\partial y}(i, j)\text{'s}.$$

FIG. 4 shows an example method 400 for generating CIIP in accordance to the present disclosure. For example, the method includes a uni-prediction based inter prediction and MPM-based intra prediction for generating CIIP.

In step 410, obtaining a reference picture in a reference picture list associated with a current prediction block.

In step 412, generating a inter prediction based on a first motion vector from a current picture to a first reference picture.

In step 414, obtaining a intra prediction mode associated with the current prediction block.

In step 416, generating a intra prediction of the current prediction block based on the intra prediction.

In step 418, generating a final prediction of the current prediction block by averaging the inter prediction and the intra prediction.

In step 420, determining whether the current prediction block is treated as inter mode or intra mode for most probable mode (MPM) based intra mode prediction.

FIG. 5A shows a diagram illustrating block quaternary partitions in a multi-type tree structure, according to an example of the present disclosure.

FIG. 5B shows a diagram illustrating block vertical binary partition in a multi-type tree structure, according to an example of the present disclosure.

FIG. 5C shows a diagram illustrating block horizontal binary partition in a multi-type tree structure, according to an example of the present disclosure.

FIG. 5D shows a diagram illustrating block vertical ternary partition in a multi-type tree structure, according to an example of the present disclosure.

FIG. 5E shows a diagram illustrating block horizontal ternary partition in a multi-type tree structure, according to an example of the present disclosure.

Combined Inter and Intra Prediction

As shown in FIG. 1 and FIG. 2, inter and intra prediction methods are used in the hybrid video coding scheme, where each PU is only allowed to select inter prediction or intra prediction for exploiting the correlation in either temporal or spatial domain while never in both. However, as pointed out in previous literature, the residual signal generated by inter-predicted blocks and intra-predicted blocks could present very different characteristics from each other. Therefore, when the two kinds of predictions can be combined in an efficient way, one more accurate prediction can be expected for reducing the energy of prediction residuals and therefore improving the coding efficiency. Additionally, in nature video content, the motion of moving objects could be complicated. For example, there could exist areas which contain both old content (e.g., the objects that are included in previously coded pictures) and emerging new content (e.g., the objects that are excluded in previously coded pictures). In such scenario, neither inter prediction nor intra prediction can provide one accurate prediction of current block.

To further improve the prediction efficiency, combined inter and intra prediction (CIIP), which combines the intra prediction and the inter prediction of one CU that is coded by merge mode, is adopted in the VVC standard. Specifically, for each merge CU, one additional flag is signaled to indicate whether the CIIP is enabled for the current CU. For luma component, the CIIP supports four frequently-used intra modes, including planar, DC, horizontal and vertical modes. For chroma components, DM (i.e., chroma reuses the same intra mode of luma component) is always applied without extra signaling. Additionally, in the existing CIIP design, weighted average is applied to combine the inter prediction samples and the intra prediction samples of one CIIP CU. Specifically, when planar or DC mode is selected, equal weight (i.e., 0.5) is applied. Otherwise (i.e., either horizontal or vertical mode is applied), the current CU is firstly split horizontally (for horizontal mode) or vertically (for vertical mode) into four equal-size areas.

Four weight sets, denoted as $(w\_intra_i, w\_inter_i)$, will be applied to combine the inter and intra prediction samples in different areas, where i=0 and i=3 represent the areas that are closest and furthest to the reconstructed neighboring samples used for intra prediction. In the current CIIP design, the values of weight sets are set as $(w\_intra_0, w\_inter_0)$ (0.75, 0.25), $(w\_intra_1, w\_inter_1)$ (0.625, 0.375), $(w\_intra_2, w\_inter_2)$ (0.375, 0.625) and $(w\_intra_3, w\_inter_3)$ (0.25, 0.75). FIG. 6A, FIG. 6B, and FIG. 6C (described below) provide examples to illustrate the CIIP mode.

Additionally, in the current VVC working specification, the intra mode of one CIIP CU can be used as the predictor to predict the intra mode of its neighboring CIIP CUs through most probable mode (MPM) mechanism. Specifically, for each CIIP CU, when its neighboring blocks are also CIIP CUs, the intra modes of those neighbors are firstly rounded to the closest mode within planar, DC, horizontal and vertical modes and then added into the MPM candidate list of the current CU. However, when constructing the MPM list for each intra CU, when one of its neighboring blocks is coded by CIIP mode, it is regarded as unavailable, i.e., the intra mode of one CIIP CU is disallowed to predict the intra modes of its neighboring intra CUs. FIG. 7A and FIG. 7B (described below) compare the MPM list generation processes of intra CUs and CIIP CUs.

Bi-Directional Optical Flow

Conventional bi-prediction in video coding is a simple combination of two temporal prediction blocks obtained from the reference pictures that are already reconstructed. However, due to the limitation of the block-based motion compensation, there could be remaining small motion that can be observed between the samples of two prediction blocks, thus reducing the efficiency of motion compensated prediction. To solve this problem, bi-directional optical flow (BDOF) is applied in the VVC to lower the impacts of such motion for every sample inside one block. Specifically, as shown in FIG. 6A, FIG. 6B, and FIG. 6C (described below), the BDOF is sample-wise motion refinement that is performed on top of the block-based motion-compensated predictions when bi-prediction is used. The motion refinement $(v_x, v_y)$ of each 4×4 sub-block is calculated by minimizing the difference between L0 and L1 prediction samples after the BDOF is applied inside one 6×6 window $\Omega$ around the sub-block. Specifically, the value of $(v_x, v_y)$ is derived as $$v_x = S_1 > 0 ? clip3 \left(-th_{BDOF}, th_{BDOF}, -\left((S_3 \cdot 2^3) \gg \lfloor \log_2 S_1 \rfloor\right)\right):0$$

$$v_y = S_5 > 0 ? clip3 \left(-th_{BDOF}, th_{BDOF}, -\right.$$

$$\left.\left((S_6 \cdot 2^3 - ((v_x S_{2,m}) \ll n_{S_2} + v_x S_{2,s})/2) \gg \lfloor \log_2 S_5 \rfloor\right)\right):$$

where $\lfloor \cdot \rfloor$ is the floor function; clip3(min, max, x) is a function that clips a given value x inside the range of [min, max]; the symbol $\gg$ represents bitwise right shift operation; the symbol $\ll$ represents bitwise left shift operation; $th_{BDOF}$ is the motion refinement threshold to prevent the propagated errors due to irregular local motion, which is equal to $2^{13-BD}$, where BD is the bit-depth of input video. In (1), $$S_{2,m} = S_2 \gg n_{S_2}, S_{2,s} = S_2 \& (2^{n_{S_2}} - 1).$$

The values of $S_1$, $S_2$, $S_3$, $S_5$ and $S_6$ are calculated as $$S_1 = \sum_{(i,j)\in\Omega} \psi_x(i,j)\cdot\psi_x(i,j), \quad S_3 = \sum_{(i,j)\in\Omega} \theta(i,j)\cdot\psi_x(i,j)$$

$$S_2 = \sum_{(i,j)\in\Omega} \psi_x(i,j)\cdot\psi_y(i,j)$$

$$S_5 = \sum_{(i,j)\in\Omega} \psi_y(i,j)\cdot\psi_y(i,j) \quad S_6 = \sum_{(i,j)\in\Omega} \theta(i,j)\cdot\psi_y(i,j)$$

where $$\psi_x(i,j) = \left(\frac{\partial I^{(1)}}{\partial x}(i,j) + \frac{\partial I^{(0)}}{\partial x}(i,j)\right) \gg 3$$

$$\psi_y(i,j) = \left(\frac{\partial I^{(1)}}{\partial y}(i,j) + \frac{\partial I^{(0)}}{\partial y}(i,j)\right) \gg 3$$

$$\theta(i,j) = \left(I^{(1)}(i,j) \gg 6\right) - \left(I^{(0)}(i,j) \gg 6\right)$$

where $I^{(k)}(i,j)$ are the sample value at coordinate (i,j) of the prediction signal in list k, k=0,1, which are generated at intermediate high precision (i.e., 16-bit);

$$\frac{\partial I^{(k)}}{\partial x}(i,j) \text{ and } \frac{\partial I^{(k)}}{\partial y}(i,j)$$

are the horizontal and vertical gradients of the sample that are obtained by directly calculating the difference between its two neighboring samples, i.e., $$\frac{\partial I^{(k)}}{\partial x}(i, j) = \left(I^{(k)}(i+1, j) - I^{(k)}(i-1, j)\right) \gg 4$$

$$\frac{\partial I^{(k)}}{\partial y}(i, j) = \left(I^{(k)}(i, j+1) - I^{(k)}(i, j-1)\right) \gg 4$$

Based on the motion refinement derived in (1), the final bi-prediction samples of the CU are calculated by interpolating the L0/L1 prediction samples along the motion trajectory based on the optical flow model, as indicated by $$pred_{BDOF}(x, y) = \left(I^{(0)}(x, y) + I^{(1)}(x, y) + b + o_{offset}\right) \gg shift$$

$$b = rnd\left(\left(v_x\left(\frac{\partial I^{(1)}(x, y)}{\partial x} - \frac{\partial I^{(0)}(x, y)}{\partial x}\right)\right)/2\right) +$$

$$rnd\left(\left(v_y\left(\frac{\partial I^{(1)}(x, y)}{\partial y} - \frac{\partial I^{(0)}(x, y)}{\partial y}\right)\right)/2\right)$$

where shift and $o_{offset}$ are the right shift value and the offset value that are applied to combine the L0 and L1 prediction signals for bi-prediction, which are equal to $15-BD$ and $1 \ll (14-BD) + 2 \cdot (1 \ll 13)$, respectively.

FIG. 6A shows a diagram illustrating a combined inter and intra prediction for horizontal mode, according to an example of the present disclosure.

FIG. 6B shows a diagram illustrating a combined inter and intra prediction for vertical mode, according to an example of the present disclosure.

FIG. 6C shows a diagram illustrating a combined inter and intra prediction for planar and DC modes, according to an example of the present disclosure.

FIG. 7A shows a flowchart of the MPM candidate list generation processes of intra CUS, according to an example of the present disclosure.

FIG. 7B shows a flowchart of the MPM candidate list generation processes of CIIP CUs, according to an example of the present disclosure.

Improvements to CIIP

Although the CIIP can enhance the efficiency of conventional motion compensated prediction, its design can still be further improved. Specifically, the following issues in the existing CIIP design in the VVC are identified in this disclosure.

First, as discussed in "combined inter and intra prediction" section, because the CIIP combines the samples of inter and intra prediction, each CIIP CU needs to use its reconstructed neighboring samples to generate the prediction signal. This means that the decoding of one CIIP CU is dependent on the full reconstruction of its neighboring blocks. Due to such interdependency, for practical hardware implementations, CIIP needs to be performed in the reconstruction stage where neighboring reconstructed samples become available for intra prediction. Because the decoding of the CUs in the reconstruction stage must be performed sequentially (i.e., one by one), the number of computational operations (e.g., multiplications, additions and bit-shifts) involved in the CIIP process cannot be too high in order to ensure enough throughput of real-time decoding.

As mentioned in the "bi-directional optical flow" section, the BDOF is enabled to enhance the prediction quality when one inter-coded CU is predicted from two reference blocks from both forward and backward temporal directions. As shown in FIG. 8 (described below), in the current VVC, the BDOF is also involved to generate the inter prediction samples for the CIIP mode. Given the additional complexity introduced by the BDOF, such design could severely lower the encoding/decoding throughput of hardware codec when the CIIP is enabled.

Second, in the current CIIP design, when one CIIP CU refers to one merge candidate that is bi-predicted, both the motion compensated prediction signals in list L0 and L1 need to be generated. When one or more MVs are not in integer precision, additional interpolation processes must be invoked to interpolate the samples at fractional sample positions. Such process not only increase the computational complexity but also increase the memory bandwidth given that more reference samples need to be accessed from external memory.

Third, as discussed in "combined inter and intra prediction" section, in the current CIIP design, the intra modes of CIIP CUs and the intra modes of intra CUs are treated differently when constructing the MPM list of their neighboring blocks. Specifically, when one current CU is coded by CIIP mode, its neighboring CIIP CUs are regarded as intra, i.e., the intra modes of the neighboring CIIP CUs can be added into the MPM candidate list. However, when the current CU is coded by intra mode, its neighboring CIIP CUs are regarded as inter, i.e., the intra modes of the neighboring CIIP CUs are excluded from the MPM candidate list. Such non-unified design may not be optimal for the final version of the VVC standard.

FIG. 8 shows a diagram illustrating a workflow of the existing CIIP design in the VVC, according to an example of the present disclosure.

Simplifying CIIP

In this disclosure, methods are provided to simplify the existing CIIP design to facilitate hardware codec implementations. In general, the main aspects of the proposed technologies in this disclosure are summarized as follows.

First, to improve the CIIP encoding/decoding throughput, it is proposed to exclude the BDOF from the generation of the inter prediction samples in the CIIP mode.

Second, to reduce the computational complexity and the memory bandwidth consumption, when one CIIP CU is bi-predicted (i.e., having both L0 and L1 MVs), methods are proposed to convert the block from bi-prediction to uni-prediction for generating the inter prediction samples.

Third, two methods are proposed to harmonize the intra modes of CIIP and intra CUs when forming the MPM candidates of their neighboring blocks.

The CHIP without the BDOF

As pointed out in "problem statement" section, the BDOF is always enabled to generate the inter prediction samples for the CIIP mode when the current CU is bi-predicted. Due to the additional complexity of the BDOF, the existing CIIP design could significantly lower the encoding/decoding throughput, especially making the real-time decoding become difficult for the VVC decoders. On the other hand, for CIIP CUs, their final prediction samples are generated by averaging the inter prediction samples and intra prediction samples. In other words, the refined prediction samples by the BDOF will not be directly used as the prediction signal for CIIP CUs. Therefore, compared to the conventional bi-predicted CUs (where the BDOF is directly applied to generate the prediction samples), the corresponding improvement obtained from the BDOF is less efficient for CIIP CUs. Therefore, based on the above considerations, it is proposed to disable the BDOF when generating the inter prediction samples of the CIIP mode. FIG. 9 (described below) illustrates the corresponding workflow of the proposed CIIP process after removing the BDOF.

FIG. 9 shows a diagram illustrating a workflow of the proposed CIIP method by removing BDOF, according to an example of the present disclosure.

The CIIP Based on Uni-Prediction

As discussed above, when the merge candidate that is referred by one CIIP CU is bi-predicted, both the L0 and L1 prediction signals are generated to predict the samples inside the CU. To reduce the memory bandwidth and the interpolation complexity, in one embodiment of the disclosure, it is proposed to only use the inter prediction samples that are generated using uni-prediction (even when the current CU is bi-predicted) to be combined with the intra prediction samples in the CIIP mode. Specifically, when the current CIIP CU is uni-predicted, the inter prediction samples will be directly combined with the intra prediction samples. Otherwise (i.e., the current CU is bi-predicted), the inter prediction samples that are used by the CIIP are generated based on the uni-prediction from one prediction list (either L0 or L1). To select the prediction list, different methods may be applied. In the first method, it is proposed to always select the first prediction (i.e., list L0) for any CIIP block that is predicted by two reference pictures.

In the second method, it is proposed always select the second prediction (i.e., list L1) for any CIIP block that is predicted by two reference pictures. In the third method, one adaptive method is applied where the prediction list that is associated with one reference picture with smaller picture order count (POC) distance from the current picture is selected. FIG. 10 (described below) illustrates the workflow of the uni-prediction based CIIP with selecting the prediction list based on POC distance.

Finally, in the last method, it is proposed to only enable the CIIP mode when the current CU is uni-predicted. Moreover, to reduce the overhead, the signaling of the CIIP enabling/disabling flag is dependent on the prediction direction of the current CIIP CU. When the current CU is uni-predicted, the CIIP flag will be signaled in bit-stream to indicate whether the CIIP is enabled or disabled. Otherwise (i.e., the current CU is bi-predicted), the signaling of the CIIP flag will be skipped and is always inferred as false, i.e., the CIIP is always disabled.

FIG. 10 shows a diagram illustrating a workflow of the uni-prediction based CIIP with selecting prediction list based on POC distance, according to an example of the present disclosure.

Harmonization of the Intra Modes of CIIP and Intra CUs for MPM Candidate List Construction As discussed above, the current CIIP design is not unified with regards to how to use the intra modes of CIIP CUs and intra CUs to form the MPM candidate list of their neighboring blocks. Specifically, both the intra modes of CIIP CUs and intra CUs can predict the intra modes of their neighboring blocks that are coded in the CIIP mode. However, only the intra modes of intra CUs can predict the intra modes of intra CUs. To achieve one more unified design, two methods are proposed in this section to harmonize the usage of the intra modes of CIIP and intra CUs for MPM list construction.

In the first method, it is proposed to treat the CIIP mode as inter mode for the MPM list construction. Specifically, when generating the MPM list of either one CIIP CU or one intra CU, when its neighboring block is coded in the CIIP mode, then the intra mode of the neighboring block is marked as unavailable. By such method, no intra modes of CIIP blocks can be used to construct the MPM list. On the contrary, in the second method, it is proposed to treat the CIIP mode as intra mode for the MPM list construction. Specifically, in this method, the intra modes of CIIP CUs can predict the intra modes of both its neighboring CIIP blocks and intra blocks. FIG. 11A and FIG. 11B (described below) illustrate the MPM candidate list generation process when the above two methods are applied.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as examples only, with a true scope and spirit of the present disclosure being indicated by the following claims.

It will be appreciated that the present disclosure is not limited to the exact examples described above and illustrated in the accompanying drawings, and that various modifications and changes can be made without departing from the scope thereof. It is intended that the scope of the present disclosure only be limited by the appended claims.

FIG. 11A shows a flowchart of the methods when enabling CIIP blocks for the MPM candidate list generation, according to an example of the present disclosure.

FIG. 11B shows a flowchart of the methods when disabling CIIP blocks for the MPM candidate list generation, according to an example of the present disclosure.

FIG. 12 shows a computing environment 1210 coupled with a user interface 1260. Computing environment 1210 can be part of data processing server. Computing environment 1210 includes processor 1220, memory 1240, and I/O interface 1250.

The processor 1220 typically controls overall operations of the computing environment 1210, such as the operations associated with the display, data acquisition, data communications, and image processing. The processor 1220 may include one or more processors to execute instructions to perform all or some of the steps in the above-described methods. Moreover, the processor 1220 may include one or more circuits that facilitate the interaction between the processor 1220 and other components. The processor may be a Central Processing Unit (CPU), a microprocessor, a single chip machine, a GPU, or the like.

The memory 1240 is configured to store various types of data to support the operation of the computing environment 1210. Examples of such data comprise instructions for any applications or methods operated on the computing environment 1210, video data, image data, etc. The memory 1240 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 1250 provides an interface between the processor 1220 and peripheral interface modules, such as a keyboard, a click wheel, buttons, and the like. The buttons may include but are not limited to, a home button, a start scan button, and a stop scan button. The I/O interface 1250 can be coupled with an encoder and decoder.

In an embodiment, there is also provided a non-transitory computer-readable storage medium comprising a plurality of programs 1242, such as comprised in the memory 1240, executable by the processor 1220 in the computing environment 1210, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, wherein the plurality of programs, when executed by the one or more processors, cause the computing device to perform the above-described method for motion prediction.

In an embodiment, the computing environment 1210 may be implemented with one or more application-specific integrated circuits (ASICs), digital signal processors (DSPs), digital signal processing devices (DSPDs), programmable logic devices (PLDs), field-programmable gate arrays (FP-GAs), graphical processing units (GPUs), controllers, micro-controllers, microprocessors, or other electronic components, for performing the above methods.

What is claimed is:

1. A method of video encoding, comprising:
generating an inter prediction of a current coding block based on an inter prediction mode;
generating an intra prediction of the current coding block based on an intra prediction mode;
generating a final prediction of the current coding block based on the inter prediction and the intra prediction;
determining that a prediction mode of the current coding block is treated as one unified mode when constructing a most probable mode (MPM) list of a neighboring coding block, the unified mode being predefined as an inter mode, or being predefined as an intra mode; and
forming a video bit-stream with information that a combined inter and intra prediction mode is applied to the current coding block.

2. The method of claim 1, wherein generating the inter prediction of the current coding block based on the inter prediction mode comprises:
generating the inter prediction of the current coding block based on at least one motion vector from a current picture to at least one reference picture of a reference picture list respectively.

3. The method of claim 2, wherein the reference picture list is a first reference picture list L0 when the inter prediction of the current coding block is performed from one reference picture in the first reference picture list L0.

4. The method of claim 2, wherein the reference picture list is a second reference picture list L1 when the inter prediction of the current coding block is performed from one reference picture in the second reference picture list L1.

5. The method of claim 2, wherein the reference picture list is associated with one first reference picture in a first reference list L0 or one second reference picture in a second reference picture list L1 that has a smaller picture order count (POC) distance to the current picture when the inter prediction of the current coding block is performed from the one first reference picture and the one second reference picture.

6. The method of claim 1, wherein generating the intra prediction of the current coding block based on the intra prediction mode comprises: generating the intra prediction of the current coding block based on an intra PLANAR prediction mode.

7. The method of claim 1, wherein a bidirectional optical flow (BDOF) operation is disabled for the current coding block.

8. A video encoding device, comprising one or more processors and one or more storages coupled to the one or more processors, wherein the video encoding device is configured to perform operations comprises:
generating an inter prediction of a current coding block based on an inter prediction mode;
generating an intra prediction of the current coding block based on an intra prediction mode;
generating a final prediction of the current coding block based on the inter prediction and the intra prediction;
determining that a prediction mode of the current coding block is treated as one unified mode when constructing a most probable mode (MPM) list of a neighboring coding block, the unified mode being predefined as an inter mode, or being predefined as an intra mode; and
forming a video bit-stream with information that a combined inter and intra prediction mode is applied to the current coding block.

9. The video encoding device of claim 8, wherein generating the inter prediction of the current coding block based on an inter prediction mode comprises:
generating the inter prediction of the current coding block based on at least one motion vector from a current picture to at least one reference picture of a reference picture list respectively.

10. The video encoding device of claim 9, wherein the reference picture list is a first reference picture list L0 when the inter prediction of the current coding block is performed from one reference picture in the first reference picture list L0.

11. The video encoding device of claim 9, wherein the reference picture list is a second reference picture list L1 when the inter prediction of the current coding block is performed from one reference picture in the second reference picture list L1.

12. The video encoding device of claim 9, wherein the reference picture list is associated with one first reference picture in a first reference picture list L0 or one second reference picture in a second reference picture list L1 that has a smaller picture order count (POC) distance to the current picture when the inter prediction of the current coding block is performed from the one first reference picture and the one second reference picture.

13. The video encoding device of claim 8, wherein generating the intra prediction of the current coding block based on the intra prediction mode comprises: generating the intra prediction of the current coding block based on an intra PLANAR prediction mode.

14. The video encoding device of claim 8, wherein a bidirectional optical flow (BDOF) operation is disabled for the current coding block.

15. A method for storing a bitstream, comprising:
performing the encoding method according to claim 1 to generate a bitstream; and
storing the bitstream on a non-transitory computer readable storage medium.

16. The method of claim 15, wherein generating the inter prediction of the current coding block based on the inter prediction mode comprises:
generating the inter prediction of the current coding block based on at least one motion vector from a current picture to at least one reference picture of a reference picture list respectively.

17. The method of claim 16, wherein the reference picture list is a first reference picture list L0 when the inter prediction of the current coding block is performed from one reference picture in the first reference picture list L0.

18. The method of claim 16, wherein the reference picture list is a second reference picture list L1 when the inter prediction of the current coding block is performed from one reference picture in the second reference picture list L1.

19. The method of claim 15, wherein generating the intra prediction of the current coding block based on the intra prediction mode comprises: generating the intra prediction of the current coding block based on an intra PLANAR prediction mode.

20. A method of video decoding, comprising:

receiving a video bit-stream, wherein the video bit-stream is formed with information that a combined inter and intra prediction mode is applied to the current coding block;

generating an inter prediction of a current coding block based on an inter prediction mode;

generating an intra prediction of the current coding block based on an intra prediction mode;

generating a final prediction of the current coding block based on the inter prediction and the intra prediction; and determining that a prediction mode of the current coding block is treated as one unified mode when constructing a most probable mode (MPM) list of a neighboring coding block, the unified mode being predefined as an inter mode, or being predefined as an intra mode.

\* \* \* \* \*